United States Patent [19]
Kox

[11] Patent Number: 5,172,285
[45] Date of Patent: Dec. 15, 1992

[54] LOADING MECHANISM AND RECORDING AND/OR REPRODUCING APPARATUS COMPRISING SUCH A LOADING MECHANISM

[75] Inventor: Franciseus A. J. M. Kox, Eindhoven, Netherlands

[73] Assignee: U.S. Philips Corporation, New York, N.Y.

[21] Appl. No.: 764,661

[22] Filed: Sep. 21, 1991

Related U.S. Application Data

[62] Division of Ser. No. 325,584, Mar. 17, 1989, Pat. No. 5,063,463.

[30] Foreign Application Priority Data

Mar. 25, 1988 [NL] Netherlands ......................... 8800751

[51] Int. Cl.$^5$ .............................................. G11B 5/008
[52] U.S. Cl. ..................................... 360/96.5; 360/137
[58] Field of Search .................... 360/96.5, 137, 85, 95

[56] References Cited

U.S. PATENT DOCUMENTS

| | | | |
|---|---|---|---|
| 4,099,213 | 7/1978 | Schatteman | 360/137 |
| 4,757,400 | 7/1988 | Park | 360/96.5 |
| 4,775,904 | 10/1988 | Kimura et al. | 360/96.5 X |
| 4,853,804 | 8/1989 | Suwa et al. | 360/85 |
| 4,866,551 | 9/1989 | Kishimoto et al. | 360/96.5 X |
| 5,063,463 | 11/1991 | Kox | 360/96.5 |

*Primary Examiner*—John H. Wolff
*Attorney, Agent, or Firm*—Brian J. Wieghaus

[57] ABSTRACT

For the transfer of an information carrier from a loading position to an operational position and vice versa a front-loading apparatus comprises a loading mechanism. The mechanism is constructed as a link mechanism which during the loading operation first moves the information carrier along a horizontal path in the apparatus, after which the information carrier is moved downwards along a vertical path to the operational position.

18 Claims, 6 Drawing Sheets

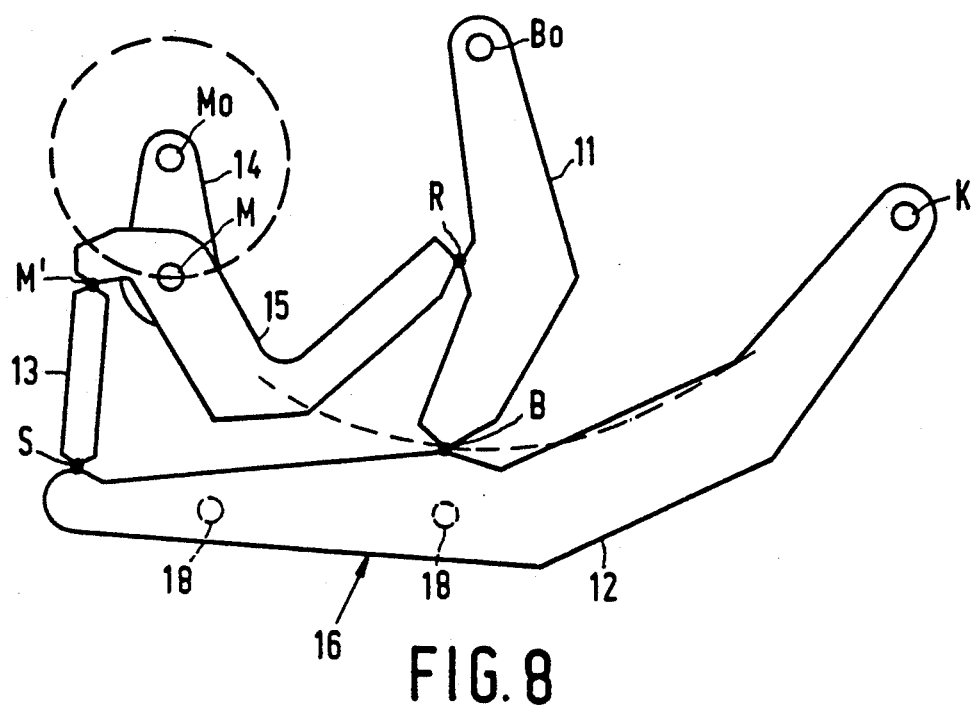
FIG. 8
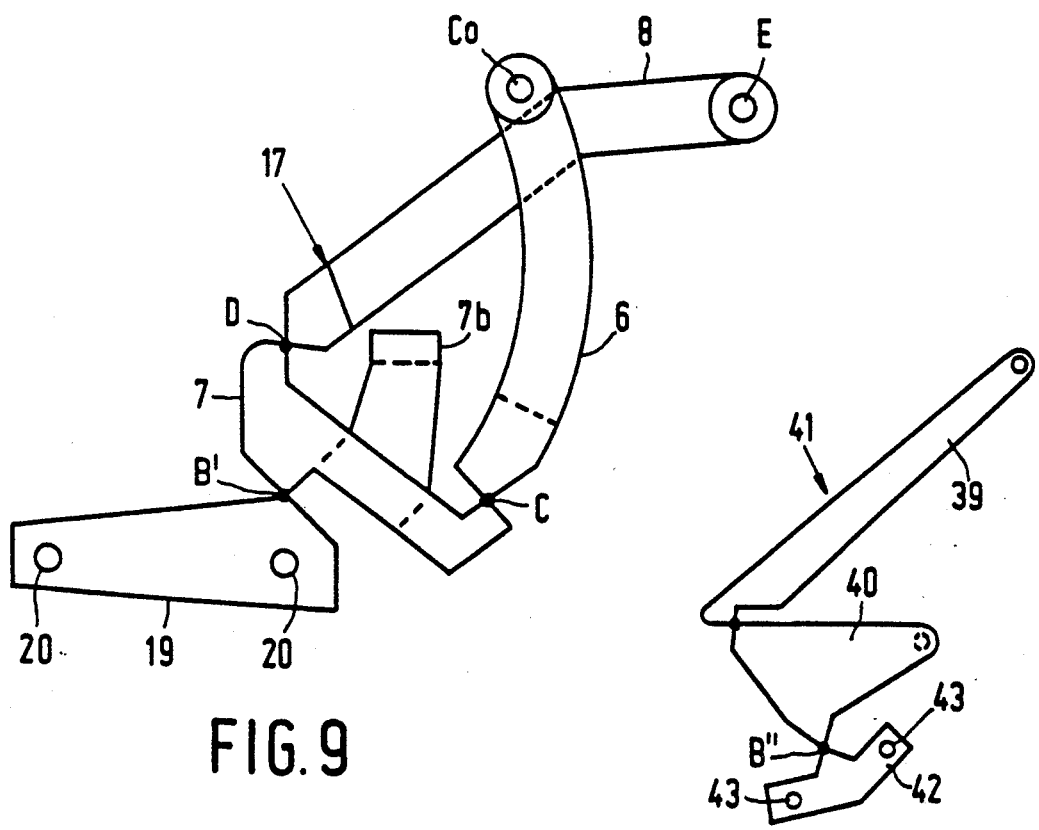
FIG. 9
FIG. 10

LOADING MECHANISM AND RECORDING AND/OR REPRODUCING APPARATUS COMPRISING SUCH A LOADING MECHANISM

This is a division of application Ser. No. 07/325,584 filed Mar. 17, 1989, now U.S. Pat. No. 5,063,463.

BACKGROUND OF THE INVENTION

The invention relates to a loading mechanism for a recording and/or reproducing apparatus which loading mechanism is constructed to transfer an information carrier by a supporting means between a loading position and an operational position in accordance with an x, y movement, which defines a horizontal and a vertical movement of the supporting means and the information carrier, which loading mechanism comprises a mechanism in which members are interconnected and connected to the supporting means via pivots. Such an x, y movement is necessary inter alia to ensure a correct operation in an apparatus into which the information carrier is loaded in a direction parallel to its main surfaces via the front side of the apparatus.

Such an apparatus is known from DE 32 38 510 A1. In this known apparatus the information carrier, in the present case a magnetic-tape cassette, is inserted horizontally into the supporting means, which supporting means is subsequently moved along a horizontal path followed by a vertical path.

The x, y movement is then provided by a slotted-link mechanism, the slot defining said x, y movement. Further, a link mechanism is provided in order to ensure that during the movement the supporting means remains parallel to the loading position. The disadvantage of a slotted-link mechanism for driving the supporting means is that this brings along substantial friction and some risk of canting.

SUMMARY OF THE INVENTION

It is the object of the invention to provide a construction for the transfer of the information carrier in the apparatus, which realizes the transfer with a higher efficiency and with a minimal risk of canting.

To this end the invention is characterized in that the loading mechanism comprises a link mechanism to perform said x, y movement.

A link mechanism produces less friction than a slotted-link mechanism. If a link mechanism is used for driving instead of being used only for maintaining the supporting means in a parallel orientation, a construction with a higher efficiency is obtained.

An embodiment of the loading mechanism in accordance with the invention is characterized in that said x, y movement can be realised by means of a link mechanism comprising members which are connected to each other, to the frame, and to the supporting means exclusively via hinges.

If in addition to the part for driving the supporting means the remainder of the loading mechanism is also constructed as a link mechanism without the use of slots and sliding elements, a loading mechanism having an even higher efficiency is obtained.

A further embodiment of the loading mechanism is characterized in that the link mechanism has at least four members, comprising a first member which is rigidly connected to the frame of the apparatus, a second member constructed as a crank which is connected to drive means and which has one end pivotally connected to one end of the first member, a third member which has one end pivotally connected to the other end of the second member, either directly or via an intermediate member, and which has its other end pivotally connected to the supporting means, a fourth member which has one end pivotally connected to the third member and which has its other end pivotally connected to the other end of the first member, the lengths of said four members and the location of the pivot between the third member and the fourth member being such that the pivot between the third member and the supporting means produces said x, y movement of the information carrier.

The use of a construction comprising only four members results in a simple loading mechanism having a high efficiency and a reduced risk of canting.

Yet another embodiment of the loading mechanism is characterized in that said x, y movement is realised by means of a link mechanism comprising a first member constructed as a crank which is connected to drive means and which has one end pivotally connected to the frame of the apparatus, a second member having one end pivotally connected to the other end of the first member and having its other end pivotally connected to the supporting means, a plate secured to the frame of the apparatus and formed with at least one slot through which a sliding element secured to the second member is movable, the lengths of said two members, the location of the sliding element on the second member, and the shape and location of the slot being such that the pivot between the second member and the supporting means provides said x, y movement of the information carrier.

The advantage of this construction is that the required mounting height is reduced, while the friction in the link mechanism hardly increases because the slot is shaped in such a way that at the location of the sliding element in the slot the movement does not give rise to any forces comprising a component perpendicular to the path of movement of the sliding element through the slot.

Still another embodiment of the loading mechanism is characterized in that there are provided two such link mechanisms, one at either side of the supporting means for the information carrier. This reduces the risk of canting of the supporting means relative to the frame of the apparatus.

Another embodiment of the loading mechanism is obtained in that the cranks of the two link mechanisms are interconnected in a torsionally rigid manner by means of a rigid shaft. This ensures that the moments of the two link mechanisms at either side of the supporting means are synchronized with one another.

A further embodiment of the loading mechanism is obtained in that at least one of the four-link mechanisms is provided with a double parallelogram construction, a first parallelogram construction being constituted by four members comprising the fourth member of the four-link mechanism, a fifth member which is rigidly connected to the frame and which has one end which coincides with the pivot between the fourth member and the frame, a sixth member having one end pivotally connected to the other end of the fifth member, a seventh member which is angular and whose vertex is pivotally connected to the other end of the fourth member, which seventh member has one end pivotally connected to the other end of the sixth member, and which double parallelogram construction comprises a second parallelogram construction constituted by four members comprising the third member of the four-link mechanism, the seventh member of the first parallelogram construction, an eighth member having one end pivotally connected to the other end of the seventh member, a ninth member which is rigidly connected to the supporting means, which has one end pivotally connected to the other end of the eighth member, and which has its other end pivotally connected to that end of the third member which is pivotally connected to the supporting means.

Still another embodiment of the loading mechanism is obtained in that at least one of the link mechanisms is provided with a construction comprising a parallelogram construction which comprises the second member of to the aforementioned mechanism, a third member which extends parallel to said second member and which has one end pivotally connected to the supporting means, an angular fourth member whose vertex is pivotally connected to the second member at the location of the sliding element of said second member and which fourth member has end pivotally connected to the other end of the third member, and a second slot in the plate which is secured to the frame, through which second slot a second sliding element is movable and is connected to the other end of the fourth member, the second slot being located in such a way that the supporting means does not rotate during operation of the loading mechanism.

By means of the two aforementioned embodiments it is achieved that during the x, y movements the supporting means performs a parallel movement and does not perform a rotary movement about its points of attachment to the mechanisms.

When the information carrier is accommodated in a holder in the form of a video or digital-audio magnetic-tape cassette the shutter of the cassette has to be opened. For this purpose a further embodiment of the loading mechanism comprises an opener for opening the holder of the information carrier, which holder is integrated in the parallelogram construction. This enables a separate mechanism for opening the holder to be dispensed with.

In a further embodiment of the loading mechanism the opener is constructed as a projection which is rigidly connected to that element of the parallelogram construction which moves parallel to the supporting means of the information carrier. This results in a construction in which the projection moves relative to the cassette during the x, y movement to open this cassette by said relative movement.

Another embodiment of a loading mechanism in accordance with the invention is characterized in that the four-link mechanism is replaced by a six-link mechanism comprising a first member rigidly connected to the frame, a second member having one end pivotally connected to one end of the first member, a third member having a point which is situated between its end pivotally connected to the other end of the second member and having one end pivotally connected to the supporting means, a fourth member having one end pivotally connected to the other end of the third member, a fifth member which is connected to drive means and has one end pivotally connected to the other end of the fourth member and which has its other end pivotally connected to the other end of the first member, a sixth member having one end pivotally connected to the fifth member at the location of the pivot between the fifth member and the fourth member and having its other end pivotally connected to a point between the ends of the second member, in such a way that the fourth and the sixth member, the part of the third member between the pivots to the second and to the fourth member and the part of the second member between the pivots to the third and to the sixth member together constite a parallelogram.

This enables the position of the rigid connecting shaft interconnecting the two cranks of the link mechanisms at either side of the supporting means to be transferred to any desired location. This may be necessary if the originally planned position of the shaft is already occupied by other elements of the apparatus.

In still another embodiment of the loading mechanism in accordance with the invention the pivots are constructed as elastic hinges. This has the advantage that the friction during the pivotal movements is substantially reduced and that the hinges can be integrated with the members.

In another embodiment the use of elastic hinges inter alia enables a part of the four-link or six-link mechanism and a part of the double parallelogram construction in the first type to be constructed each as a single integrated element, a part of the parallelogram construction in the second type to be constructed as a single integrated element. This yields advantages in the manufacture and assembly of the loading mechanism, a small number of parts resulting in lower cost.

Yet another embodiment of the loading mechanism is characterized in that the elastic hinges and/or the integrated elements are moulded from a plastics. This has the advantage that they can be manufactured simply and cheaply.

The invention further relates to an apparatus for recording and/or reproducing information on/from an information carrier, the information carrier being transferred by means of one of the embodiments of the loading mechanism described in the foregoing.

BRIEF DESCRIPTION OF THE DRAWINGS

Embodiments of the invention will now be described in more detail, by way of example, with reference to the accompanying drawings. In the drawings:

FIG. 8 shows a part of the six-link mechanism shown in FIG. 6 integrated to a single element, FIG. 9 shows the part of the double parallelogram construction shown in FIG. 2 integrated to a single element, FIG. 10 shows the part of the parallelogram construction of FIG. 4 integrated to a single element.

DESCRIPTION OF THE PREFERRED EMBODIMENTS

Figure 1:
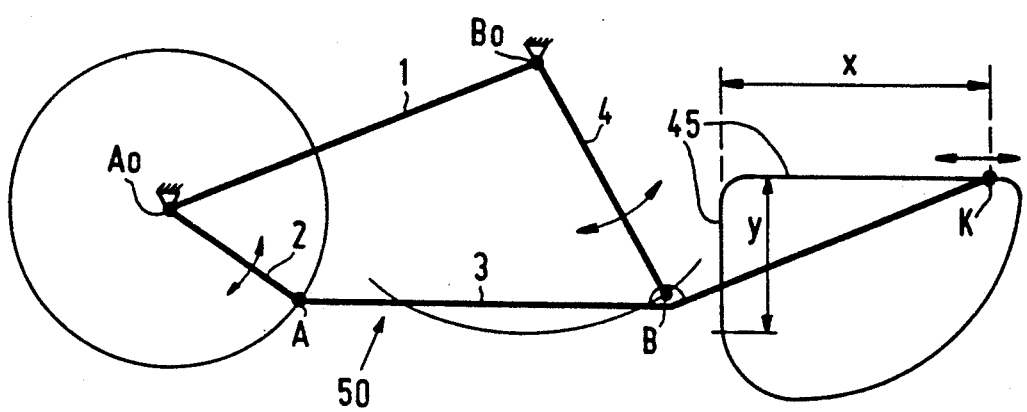
FIG. 1 shows a four-link mechanism which provides the desired x, y movement.

FIG. 1 shows a four-link mechanism 50 which constitutes the basis for realising the x, y movement. The four-link mechanism 50 comprises a first member 1, a second member 2 constructed as a crank, a third member 3, and a fourth member 4. The member 1 is integrated with the frame 24 of a recording and/or reproducing apparatus 23. The member 2 and the member 4 each have one of their ends pivotally connected to the member 1 (Ao, Bo). The member 3 has one end pivotally connected to the other end of the crank 2 (A) and between its two ends it is pivotally connected to the member 4 (B). The other end K of the member 3 is now subjected to the desired x, y movement if the length of the members have been selected correctly and the crank 2 is rotated about its pivot Ao to the member 1.

A supporting means 25 for an information carrier 26 is pivotally connected to the free end K of the member 3. In order to prevent the supporting means 25 from rotating about the free end K of the member 3 the four-link mechanism is provided with a double parallelogram construction (Bo, B, Co, C, B, D, E, K, see FIG. 2). This double construction comprises a first parallelogram construction constituted by the member 4 of the four-link mechanism, a fifth member 5, a sixth member 6 and a seventh member 7. The member 5 of this first parallelogram construction is integrated with the frame 24 of the apparatus 23 and has one end connected to the pivot Bo of the member 4, the member 6 has one end pivotally connected to the other end of the member 5 (Co) and has its other end pivotally connected to one end of the member 7 (C), the latter having an angular shape and having its vertex pivotally connected to the pivot B of the member 4.

A second parallelogram construction comprises the member 3 of the four-link mechanism, the member 7 of the first parallelogram construction, an eighth member 8, and a ninth member 9. The member 7 of this second parallelogram construction has its other end pivotally connected to one end of the member 8 (D), the other end of the member 8 being pivotally connected to one end of the member 9, which member is integrated with the supporting means 25 and has its other end pivotally connected to the member 3 (K). This construction ensures that the orientation of the supporting means 25 is maintained during the x, y movement.

If the pivot (Co) between the member 6 and the frame 24 is transferred slightly towards the pivot (Bo) between the member 4 and the frame 24 it can be achieved that in the loading position the supporting means 25 projects obliquely from the apparatus 23, which enables an information carrier 26 to be inserted at an angle instead of horizontally, whilst in the operational position the position of the supporting means 25 is not changed in comparison with its position in the embodiment described in the foregoing.

Figure 3:
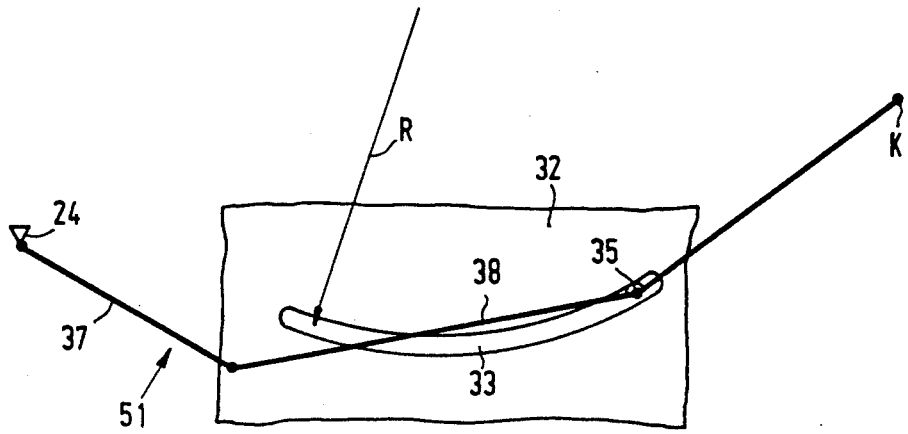
FIG. 3 shows an alternative mechanism which is kinematically identical to the four-link mechanism.

FIG. 3 illustrates an alternative link mechanism 51 which is kinematically identical to the four-link mechanism 50 shown in FIG. 1. Here the function of the member 4 of the four-link mechanism 50 is performed by a slot 33 formed in a plate 32 secured to the frame 24 and a sliding element 35 connected to a member 38 corresponding to the member 3 of the four-link mechanism 50. The slot 33 covers a part of a circular path having a radius R equal to the length of the member 4. The sliding element 35 is secured to the member 38 at a location corresponding to the pivot B between the member 4 and the member 3. The member 38 has one end pivotally connected to the supporting means, its other end being pivotally connected to a crank 37, which is driven by drive means, not shown.

Figure 2:
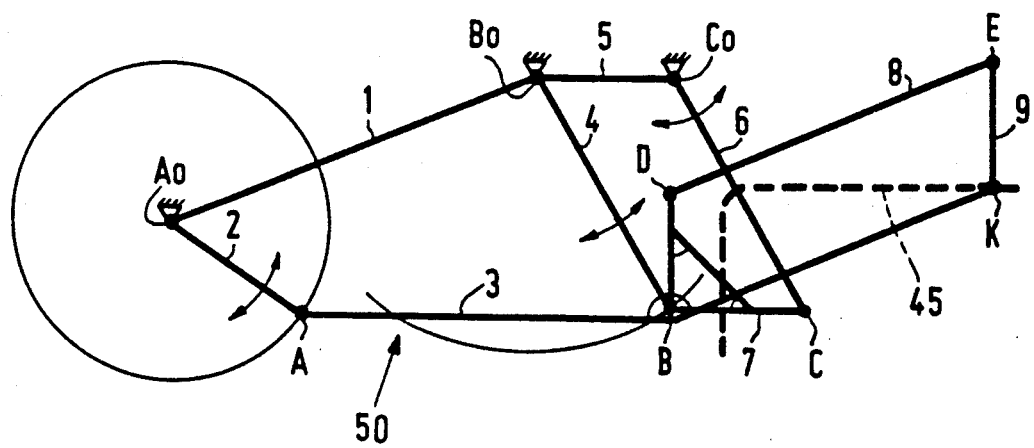
FIG. 2 shows the four-link mechanism of FIG. 1 to which has been added a double parallelogram construction.

This alternative link mechanism 51 is provided with a parallelogram construction (FIG. 4) which is kinematically identical to the double parallelogram construction shown in FIG. 2. This parallelogram construction comprises a member 38, an angularly member 40 whose vertex is pivotally connected to a member 38 at the location of the sliding element 35 and a member 39 having one end pivotally connected to the supporting means 25 and having its other end pivotally connected to one end of the member 40. This parallelogram construction has the same function as the second parallelogram construction of the double parallelogram construction shown in FIG. 2. In order to maintain the orientation of the supporting means 25 and hence that of the member 40 during operation of the mechanism the other end of the member 40 carries a second sliding element 36 which is movable in a second slot 34. This second slot 34 has the same shape as the first slot 33 and is formed in the plate 32 in such a way that the orientation of the supporting means 25 is maintained during operation. This second slot 34 performs the function of the first parallelogram construction of the double parallelogram construction shown in FIG. 2.

In order to preclude canting and asynchronous movements of the supporting means 25 such a link mechanism 50; 51 is arranged at either side of the supporting means 25 and the cranks 2, 37 at either side of the supporting means 25 are interconnected via a torsionally rigid shaft 21. The parallelogram construction is arranged at only one side of the supporting means 25.

Figure 6:
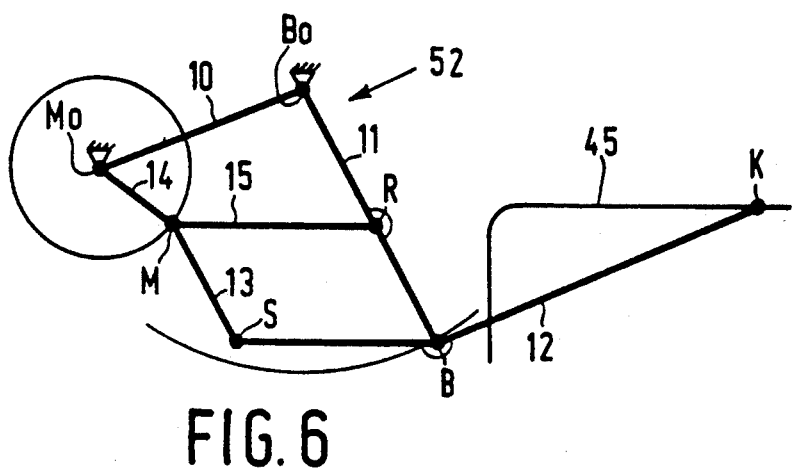
FIG. 6 shows a six-link mechanism.
Figure 7:
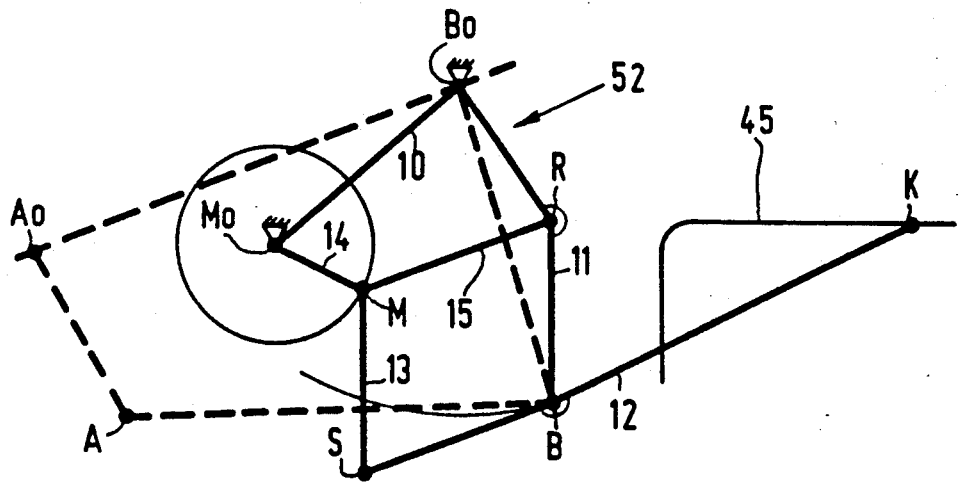
FIG. 7 shows an other embodiment of a six-link mechanism.

The shaft 21 is rotated by drive means, not shown. However, it may occur that said shaft 21 cannot be arranged at the location (Ao) prescribed by the constructions illustrated in FIGS. 1 and 2. If, in accordance with another embodiment of the loading mechanism according to the invention, the four-link mechanism 50 is extended to a six-link mechanism 52 this enables the shaft 21 to be arranged at any desired location (Mo in FIG. 6 and FIG. 7).

Figure 5:
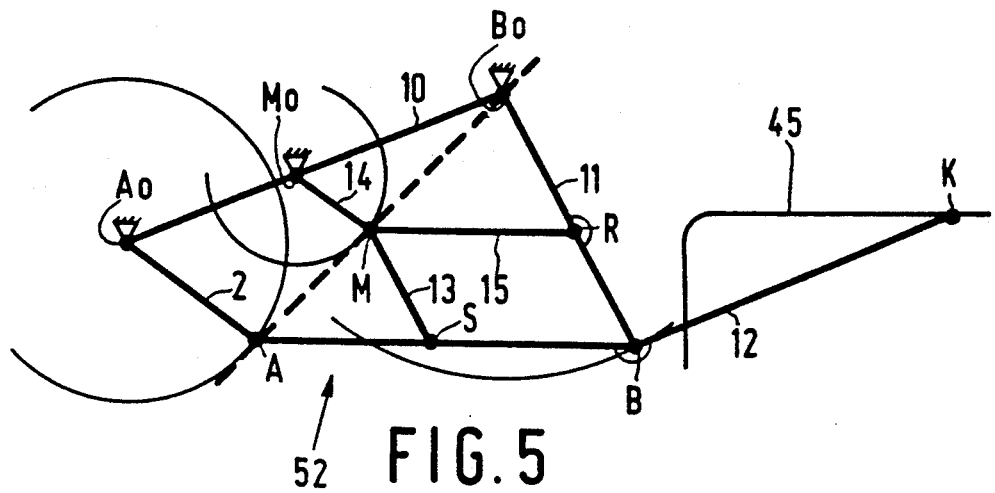
FIG. 5 shows a construction to modify the four-link mechanism into a six-link mechanism.

Said six-link mechanism 52 comprises a member 10 which is integrated with the frame, a member 14 constructed as a crank, a member 12 which corresponds to the member 3 of the four-link mechanism 50, a member 11 which corresponds to the member 4 of the four-link mechanism 50, a member 13, and a member 15. The six-link mechanism 52 can be derived from the four-link mechanism 50 in the following manner. The members 13 and 15 have one end pivotally connected to points S and R on the members 12 and 11 respectively and have their other ends pivotally interconnected (M). The member 11 is connected to the member 12 via the pivot B. The pivots B, S and R are arranged in such a way that the members 13 and 15, the part of the member 11 between the pivots B and R, and the part of the member 12 between the pivots B and S constitute a parallelogram. If the crank 14 has one end connected to the pivot M and has its other end pivotally connected to the frame 24 of the apparatus (Mo, FIG. 5), if the crank 2 and the part of the member 12 between the pivots with the crank 2 and the member 13 (FIG. 6) are removed, and if the lengths of the members are suitable selected and the members 11 and 12 are provided with bends at the location of the pivots S and R of these members (FIG. 7), a six-link mechanism 52 is obtained which at the end K of the member 12 performs the same x, y movement as the four-link mechanism, the principal difference being that the driving point Ao has been transferred to another location (Mo in FIG. 6 and FIG. 7).

FIG. 8 shows said six-link mechanism in which the members have been replaced by connecting elements, of which the elements 11, 12, 13 and 15 are interconnected by elastic hinges to be integrated to a single element 16. This integrated element is moulded from a plastics. Since the pivot M between the integrated element 16 and the crank 14 is not an elastic hinge, the elastic hinge between the element 13 and the element 15, which coincides with said pivot M in the embodiment shown in FIG. 7, has been transferred to point M'. The element 12 of the integrated element 16 comprises two pin-shaped projections 18 to which the double parallelogram system can be secured.

FIG. 9 shows that part of said double parallelogram construction which does not comprise any elements already used in the four-link mechanism. Again the members of this part have been replaced by connecting elements interconnected by elastic hinges to form a single integrated part 17. Also in this case the integrated part is molded from a plastics.

Figure 4:
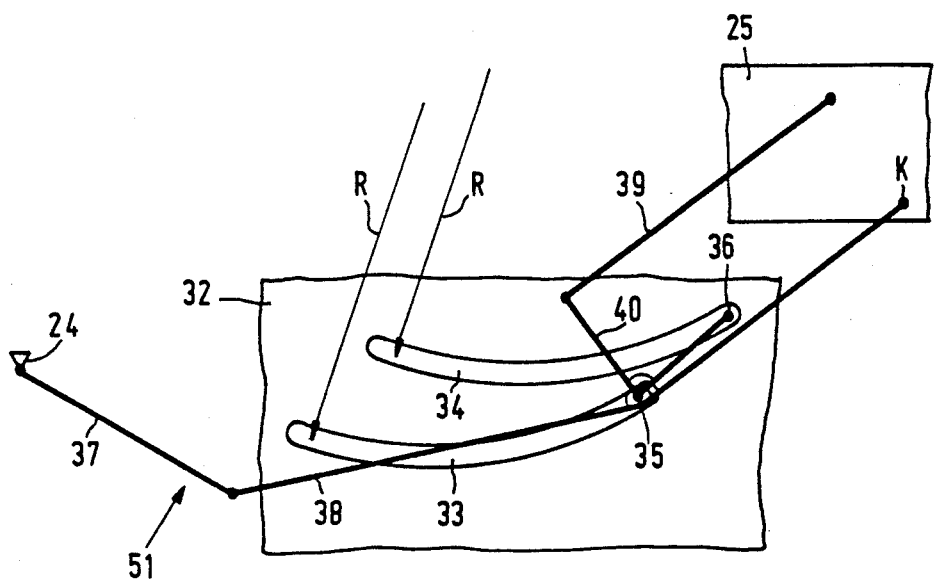
FIG. 4 shows the alternative mechanism extended by a parallelogram construction.

FIG. 10 shows a part of the parallelogram construction shown in FIG. 4. The members 39 and 40 are constructed as elements which are interconnected by an elastic hinge to form a single integrated element 41. Again this integrated part is moulded from a plastics.

The element 7; 40 which moves parallel to the supporting means 25 comprises an opener 7b for opening the holder of the information carrier. Said opener 7b is constructed as a projection which is rigidly connected to the element 7; 40. Moreover, the element 7; 40 is connected to an auxiliary element 19; 42 by an elastic hing B'; B''. This auxiliary element 19; 42 is formed with two recesses 20; 43 to establish the connection with the integrated element 16 and with the element constituting the member 38 (FIG. 11).

Figure 11:
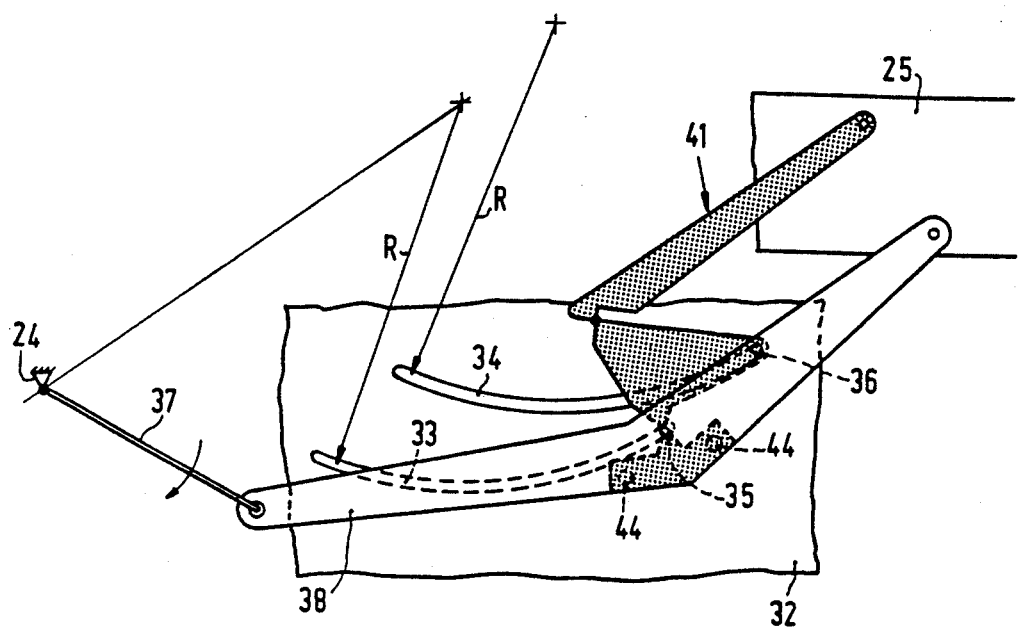
FIG. 11 shows the mechanism of FIG. 3 provided with the integrated single-element part of FIG. 10.

FIG. 11 shows the loading mechanism comprising the assembly of the integrated element 41 and the element 38. The element 38 comprises two projections which can be pressed into the recesses 43 in the auxiliary element 42 to establish the connection.

Figure 12:
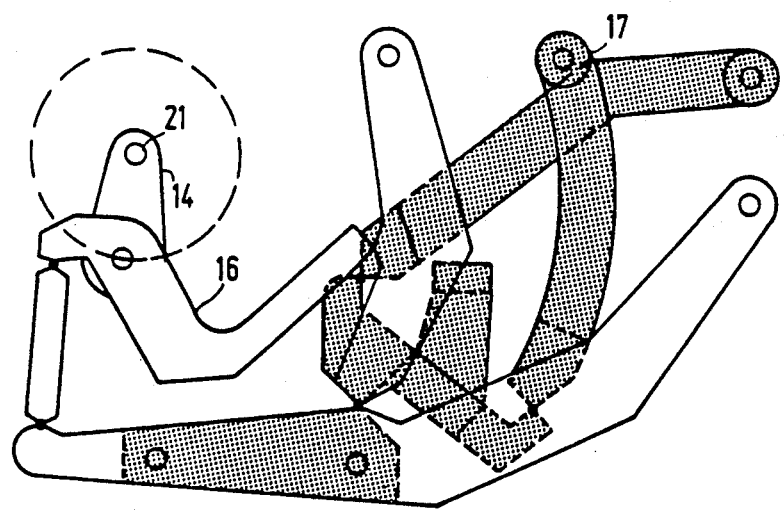
FIG. 12 shows the integrated single element parts of FIGS. 8 and 9 in the assembled condition.

FIG. 12 shows the assembly comprising the two integrated elements of the six-link mechanism 16 and of the double parallelogram system 17.

Figure 13:
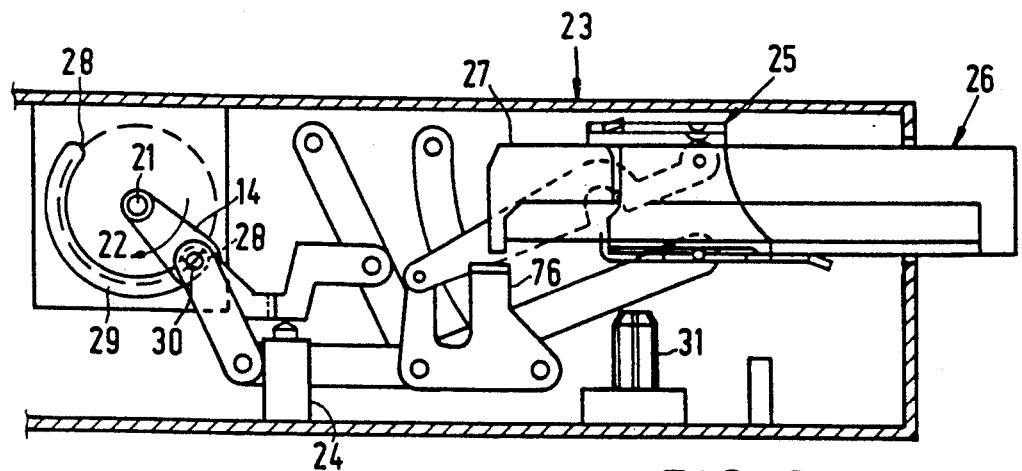
FIG. 13 shows a loading mechanism comprising the part shown in FIG. 12 in its loading position.

The operation of the loading mechanism will now be explained by a description of an embodiment of the invention. The information carrier 26 is loaded into the apparatus 23 with the aid of the supporting means 25, which transfers the information carrier 26 from a loading position into an operational position. For this purpose the information carrier 26 is placed on the supporting means 25 when this is in the loading position, see FIG. 13.

Figure 14:
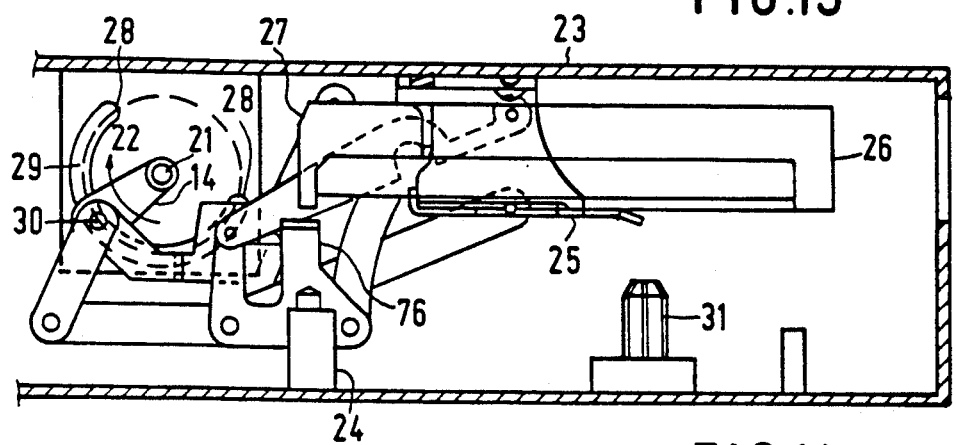
FIG. 14 shows the loading mechanism of FIG. 13 in an intermediate position.
Figure 15:
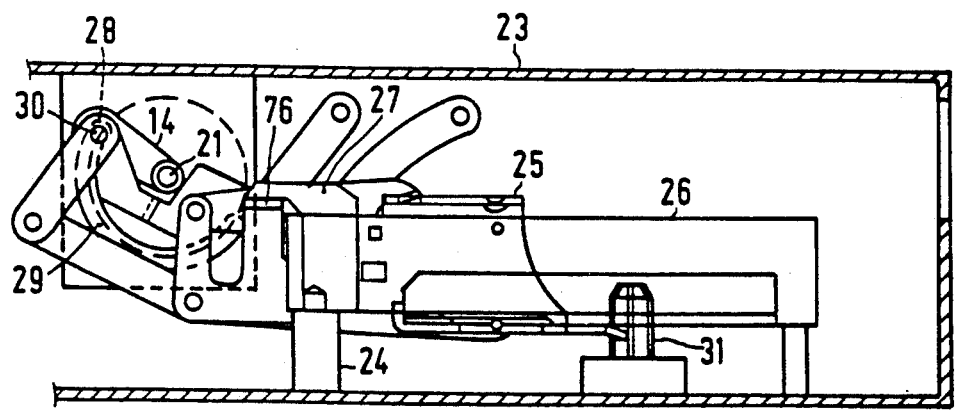
FIG. 15 shows the loading mechanism of FIG. 13 in the operational position.

The information carrier 26 may be accommodated in a holder, for example a magnetic-tape cassette or a disc accommodated in a holder, or the information carrier 26 is not accommodated in a holder and is for example a disc, in which case the supporting means 25 of the apparatus 23 is provided with a holder in which the disc can be placed. In the present example the information carrier 26 is accommodated in a holder and the information carrier 26 with the holder takes the form of a magnetic-tape cassette 26. After the information carrier 26 has been placed on the supporting means 25 the latter will transfer the information carrier 26 to an operational position. For this purpose the supporting means 25 first moves through a horizontal path into the interior of the apparatus 23, see FIG. 14, which movement is followed by a vertical path in a downward direction into an operational position, see FIG. 15.

This is achieved by rotating the shaft 21 interconnecting the two cranks in the direction indicated by the arrow 22. The shaft 21 is rotated by drive means, not shown. The drive means are put into operation by changing over a switch, not shown, which is actuated via an actuating key, not shown, or which is actuated by processing against the supporting means 25.

During the downward movement the shutter 27 of the cassette 26 is opened by the opener 7b, which moves towards the cassette 26 and presses against the shutter 27 of the cassette 26. When the information carrier 26 is removed from the apparatus 23 this sequence of operation is reversed.

The loading link-mechanism described in the foregoing and its kinematically identical mechanism comprising members and slots are only a few of the possible embodiments of the loading mechanism in accordance with the invention. In order to obtain the desired x, y movement it is possible, starting the present invention, to construct a wide variety of mechanisms comprising only members or comprising members and slots. A number of modifications to the embodiments described hereinbefore are given below. The scope of the invention is not limited thereto, but other modifications can also be constructed in this way.

The embodiment of the loading mechanism in accordance with the invention described above can also be constructed with the parallelogram system being added at either side. Moreover, the loading mechanism can also be arranged at only one side of the supporting means provided that the mechanism is rigid enough and/or provided that at the other side the supporting means is supported by a construction connected to the frame of the apparatus. The loading mechanism also functions without the addition of the parallelogram construction, but in that case the apparatus or the loading mechanism should comprise another mechanism which ensures the correct orientation of the supporting means.

The use of the loading mechanism is not limited to apparatuses for magnetic-tape cassettes, such as video and audio recorders, but can also be employed in disc-record players such as Compact Disc players, video disc players, CD-video players, and computer disc drives.

I claim:

1. A recording and/or reproducing apparatus, comprising:
   a frame;
   a support for an information carrier, said support being moveable with respect to said frame;
   drive means for driving a crank; and
   a loading mechanism for moving said support, and thereby said information carrier, in both a first direction and a second direction, substantially orthogonal to said first direction, said loading mechanism comprising a first linkage mechanism including a first, crank member having one end connected to said drive means and an other end pivotally connected to said frame, a second member having one end pivotally connected to said other end of said first member and having its other end pivotally connected to said support, a sliding element secured to said second member, and a plate secured to said frame and including a slot through which said sliding element secured to said second member is movable, the lengths of said first and second members, the location of said sliding element on said second member, and the shape and location of said slot being chosen such that pivoting of said first, crank member by said drive means produces movement of said support, and therefore of the information carrier, in said first and second directions.

2. An apparatus as claimed in claim 1, wherein said first linkage mechanism further comprises a parallelogram construction which includes said second member, a third member extending parallel to said second member and having one end pivotally connected to said support, an angular fourth member having a vertex pivotally connected to said second member at the location of said sliding element of said second member, one end of said fourth member being pivotally connected to the other end of said third member, a second sliding element connected to the other end of said fourth member, and a second slot in said plate which is secured to said frame, through which second slot said second sliding element is movable, said second slot being located in such a way that said support does not rotate during operation of said loading mechanism.

3. An apparatus as claimed in claim 2, wherein said support is adapted for receiving a holder of the information carrier, which holder includes a moveable shutter, and said parallelogram construction comprises opening means for opening said shutter.

4. An apparatus as claimed in claim 3, wherein said opening means includes a projection which is rigidly connected to said fourth member.

5. An apparatus as claimed in claim 2, wherein a part of said first linkage mechanism is constructed as a single integrated element.

6. An apparatus as claimed in claim 5, wherein said integrated element is molded from a plastic.

7. An apparatus according to claim 6, further comprising a second said linkage mechanism identical to said first linkage mechanism and positioned on the opposite side of said support from said first linkage mechanism, and a rigid shaft interconnecting said first, crank members in a torsionally rigid manner.

8. An apparatus as claimed in claim 1, wherein each of said pivotal connections includes a hinge.

9. An apparatus as claimed in claim 8, wherein each hinge is elastic.

10. An apparatus as claimed in claim 9, wherein each elastic hinge is molded from a plastic.

11. An apparatus according to claim 1, further comprising a second said linkage mechanism identical to said first linkage mechanism and positioned on the opposite side of said support from said first linkage mechanism, and a rigid shaft interconnecting said first, crank members in a torsionally rigid manner.

12. A recording and/or reproducing apparatus, comprising:

a frame;

a support for an information carrier, said support being moveable with respect to said frame;

drive means for driving a crank; and a loading mechanism for moving said support, and thereby said information carrier, in both a first direction and a second direction, substantially orthogonal to said first direction, said loading mechanism comprising a first linkage mechanism having six link members, including:

a first member rigidly connected to said frame, a second member having one end pivotally connected to one end of said first member, a third member having a point, situated between its ends thereof, pivotally connected to the other end of said second member and having one end pivotally connected to said support, a fourth member having one end pivotally connected to said third member, a fifth, crank member connected to said drive means and having one end pivotally connected to the other end of said fourth member and its other end pivotally connected to said first member, and a sixth member having one end pivotally connected to said fifth member at the location of the pivot between said fifth member and said fourth member, and its other end pivotally connected to a point between the ends of said second member, in such a way that said fourth member and said sixth member, the part of the third member between the pivots to said second member and to said fourth member and the part of the second member between the pivots to said third member and to said sixth member together constitute a parallelogram, the lengths of said six members and the location of said pivotal connections between said members being chosen such that pivoting of said fifth, crank member by said drive means produces movement of said support, and therefore of the information carrier, in said first and second directions.

13. An apparatus as claimed in claim 12, wherein each of said pivotal connections includes a hinge.

14. An apparatus as claimed in claim 13, wherein each hinge is elastic.

15. An apparatus as claimed in claim 14, wherein a part of said first linkage mechanism is constructed as a single integrated element.

16. An apparatus as claimed in claim 15, wherein said integrated element is molded from a plastic.

17. An apparatus according to claim 16, further comprising a second said linkage mechanism identical to said first linkage mechanism and positioned on the opposite side of said support from said first linkage mechanism, and a rigid shaft interconnecting said fifth, crank members in a torsionally rigid manner.

18. An apparatus according to claim 12, further comprising a second said linkage mechanism identical to said first linkage mechanism and positioned on the opposite side of said support from said first linkage mechanism, and a rigid shaft interconnecting said fifth, crank members in a torsionally rigid manner.

* * * * *